(12) United States Patent
Richard

(10) Patent No.: US 8,756,360 B1
(45) Date of Patent: Jun. 17, 2014

(54) PCI-E COMPATIBLE CHASSIS HAVING MULTI-HOST CAPABILITY

(75) Inventor: Jared Richard, Fort Collins, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 115 days.

(21) Appl. No.: 13/245,176

(22) Filed: Sep. 26, 2011

(51) Int. Cl.
G06F 13/00 (2006.01)
G06F 13/40 (2006.01)

(52) U.S. Cl.
CPC .................................. *G06F 13/4022* (2013.01)
USPC .......................................... 710/317; 710/316

(58) Field of Classification Search
USPC ........ 710/300–317, 8–19, 1–2, 62–64, 72–74
See application file for complete search history.

(56) References Cited

U.S. PATENT DOCUMENTS

| | | | | |
|---|---|---|---|---|
| 5,875,314 A * | 2/1999 | Edholm | ........................ | 710/317 |
| 7,363,417 B1 * | 4/2008 | Ngai | ............................ | 710/316 |
| 7,660,925 B2 * | 2/2010 | Larson et al. | .................. | 710/107 |
| 7,779,184 B2 * | 8/2010 | Hubert et al. | .................... | 710/74 |
| 8,312,298 B2 * | 11/2012 | Peterson et al. | .............. | 713/300 |
| 8,352,645 B2 * | 1/2013 | Cummings et al. | ............. | 710/22 |
| 2006/0294261 A1 * | 12/2006 | Nordstrom et al. | ............... | 710/3 |
| 2007/0067541 A1 * | 3/2007 | Chang | ........................... | 710/307 |
| 2007/0073959 A1 * | 3/2007 | McAfee et al. | ............... | 710/316 |
| 2007/0139423 A1 * | 6/2007 | Kong et al. | .................... | 345/502 |
| 2007/0233930 A1 * | 10/2007 | Gallagher et al. | ............ | 710/307 |
| 2007/0239922 A1 * | 10/2007 | Horigan | ........................ | 710/307 |
| 2007/0239925 A1 * | 10/2007 | Koishi | ........................... | 710/316 |
| 2008/0244141 A1 * | 10/2008 | Babin | ............................ | 710/301 |
| 2009/0006681 A1 * | 1/2009 | Hubert et al. | .................... | 710/74 |
| 2010/0199011 A1 * | 8/2010 | Chen et al. | .................... | 710/301 |
| 2012/0311215 A1 * | 12/2012 | Cong | ............................ | 710/301 |

\* cited by examiner

*Primary Examiner* — Raymond Phan

(57) ABSTRACT

A peripheral component interconnect express (PCI-E) compatible chassis comprises a plurality of peripheral slots each configured to receive a peripheral module, a system slot configured to receive a first upstream host to control at least one of the peripheral modules and a reconfigurable switch fabric configured to allow at least one of the peripheral modules to receive a second upstream host to control other peripheral modules independent of the first upstream host.

20 Claims, 10 Drawing Sheets

PCI-E COMPATIBLE CHASSIS HAVING MULTI-HOST CAPABILITY

BACKGROUND

Peripheral component interconnect express (PCI-E) is a standard for incorporating peripheral devices in computing systems and other electronic apparatuses. The standard defines interfaces and protocols for communication with PCI-E compatible devices and is commonly used in consumer and industrial applications as a motherboard level interconnect, a backplane interconnect, and an expansion card interface.

PCI-E has also been adapted for various modular applications, such as external chassis used to connect numerous peripheral devices to a host system. These modular applications have achieved popularity because they provide system integrators with flexibility to connect various peripheral devices according to their specific needs.

In an effort to standardize certain aspects of modular PCI-E applications, committees have developed compact PCI express (cPCI-E), which is a ruggedized version of PCI-E that can be used to incorporate peripherals in an external chassis, and PCI-E eXtensions for instrumentation (PXI-E), which is a version of cPCI-E adapted for test and measurement equipment such as oscilloscopes, logic analyzers, and so on.

A cPCI-E or PXI-E chassis typically comprises a system slot configured to receive a system controller, a plurality of peripheral slots each configured to receive a peripheral module, and a PCI-E switch fabric connected between the system slot and the peripheral slots. The chassis can be implemented in a standalone configuration where the system controller comprises an embedded controller such as a personal computer (PC) chipset, or it can be implemented in a hosted configuration where the system controller is connected to a remote host via a PCI-E cabled interface. A cPCI-E or PXI-E chassis can also be expanded through the use of cabled PCI-E modules, which can be inserted into the slots of the chassis and connected to additional downstream chassis or modules. For example, a cabled PCI-E module can be used to connect a first chassis to a second downstream chassis in a daisy chained configuration.

Cabled PCI-E modules communicate using signaling standards defined by a cabled PCI-E specification. The specification defines signaling for two types of devices, including a cabled host adapter, which can be connected to an upstream entity such as a peripheral slot of an upstream chassis or host PC, and a cabled target adapter, which can be connected to a downstream entity, such as a system slot of a downstream chassis.

Although conventional cPCI-E and PXI-E chassis provide system integrators with flexibility to customize a system, conventional cPCI-E and PXI-E chassis also have various shortcomings that can prevent chassis resources from being used efficiently. For example, in conventional cPCI-E and PXI-E chassis, peripheral modules must be controlled through a single entity such as an embedded controller or remote host. This can create a bandwidth bottleneck for peripheral modules that need to communicate with the controller or host, which can limit their performance. This limitation is a consequence of various factors such as the way the cPCI-E and PXI-E specifications are defined, and the way switch fabrics are conventionally configured in cPCI-E and PXI-E chassis.

In addition, the slots of cPCI-E and PXI-E chassis have fixed lane widths, but the peripheral modules may not require all of the lanes. For example, a PXI-E chassis may have multiple slots with eight lanes, but many peripheral modules only require four lanes. As a result, some of the lanes may remain idle.

Finally, the slots of a conventional cPCI-E and PXI-E chassis are limited to using specific types of cabled PCI-E modules, which can limit their flexibility. For instance, the system slot of a conventional cPCI-E or PXI-E chassis can receive a cabled target adapter, but not a cabled host adapter. Accordingly, the system slot is always treated as a downstream slot when connected to a cabled PCI-E module. Similarly, the peripheral slots of a conventional cPCI-E or PXI-E chassis can receive a cabled host adapter to connect to downstream devices, but not a cabled target adapter. Accordingly, the peripheral slots are always treated as upstream slots when connected to cabled PCI-E modules. Like the above-described bandwidth bottlenecks, this limitation is also a consequence of factors such as the way the cPCI-E and PXI-E specifications are defined, and the way switch fabrics are conventionally configured in cPCI-E and PXI-E chassis.

Due to these and other limitations of existing cPCI-E and PXI-E chassis implementations, there is a need for cPCI-E and PXI-E chassis implementations providing improved flexibility and performance.

SUMMARY

According to a representative embodiment, a PCI-E compatible chassis comprises a plurality of peripheral slots each configured to receive a peripheral module, a system slot configured to receive a first upstream host to control at least one of the peripheral modules, and a reconfigurable switch fabric configured to allow at least one of the peripheral modules to receive a second upstream host to control other peripheral modules independent of the first upstream host.

According to another representative embodiment, a PCI-E system comprises a system slot and a plurality of peripheral slots arranged in a chassis, and a multi-link PCI-E module connected to the system slot or one of the peripheral slots and configured to form multiple upstream or downstream links through a single slot of the chassis.

BRIEF DESCRIPTION OF THE DRAWINGS

The described embodiments are best understood from the following detailed description when read with the accompanying drawing figures. Wherever applicable and practical, like reference numerals refer to like elements.

DETAILED DESCRIPTION

Figure 1:
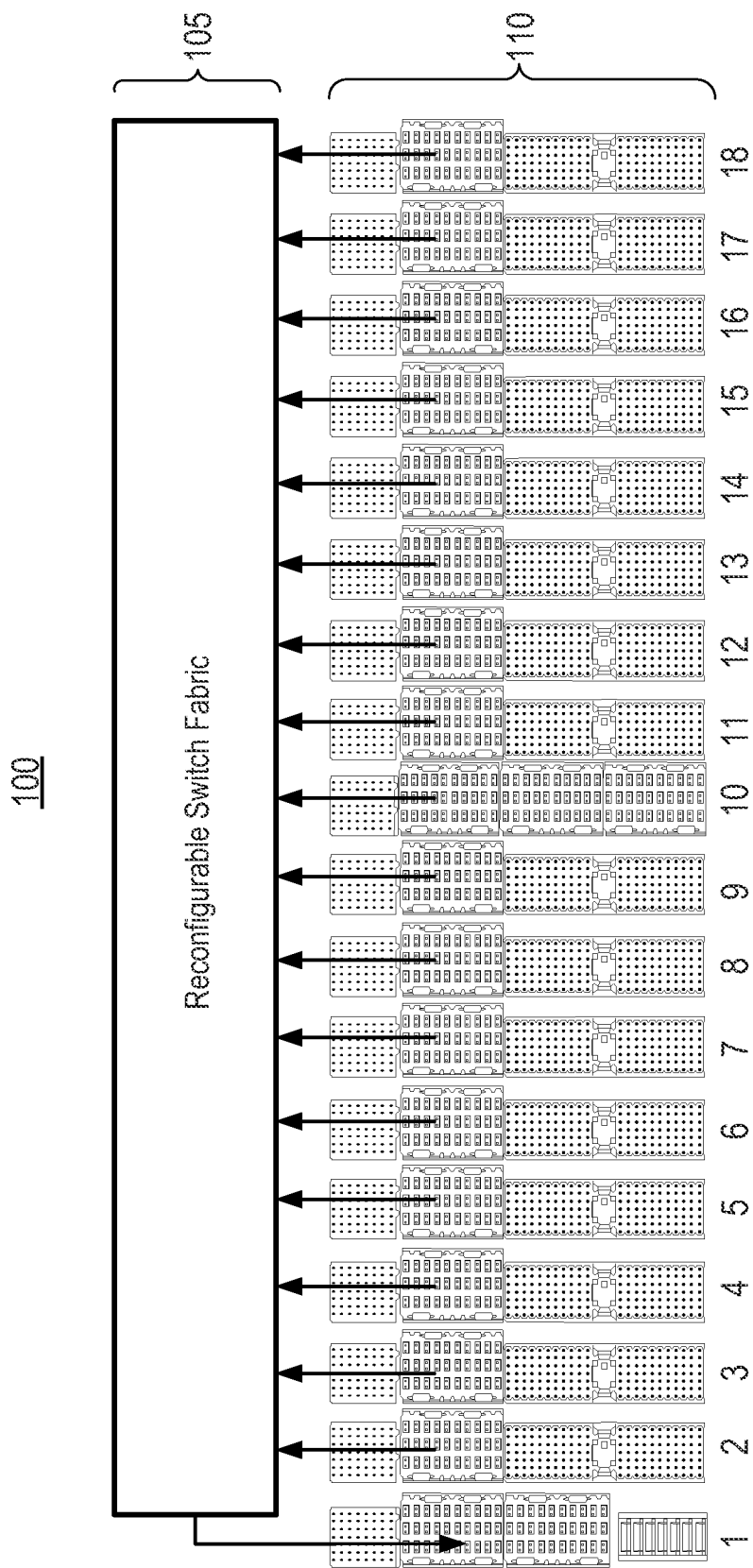
FIG. 1 is a diagram illustrating a PXI-E chassis comprising a reconfigurable switch fabric in accordance with a representative embodiment.

In the following detailed description, for purposes of explanation and not limitation, representative embodiments disclosing specific details are set forth in order to provide a thorough understanding of the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatuses and methods may be omitted so as to not obscure the description of the example embodiments. Such methods and apparatuses are clearly within the scope of the present teachings.

The terminology used herein is for purposes of describing particular embodiments only, and is not intended to be limiting. The defined terms are in addition to the technical and scientific meanings of the defined terms as commonly understood and accepted in the technical field of the present teachings.

As used in the specification and appended claims, the terms 'a', 'an' and 'the' include both singular and plural referents, unless the context clearly dictates otherwise. Thus, for example, 'a device' includes one device and plural devices.

As used in the specification and appended claims, and in addition to their ordinary meanings, the terms 'substantial' or 'substantially' mean to within acceptable limits or degree.

As used in the specification and the appended claims and in addition to its ordinary meaning, the term 'approximately' means to within an acceptable limit or amount to one having ordinary skill in the art. For example, 'approximately the same' means that one of ordinary skill in the art would consider the items being compared to be the same.

The described embodiments relate generally to modular PCI-E based systems such as cPCI-E and PXI-E chassis. In certain embodiments, a cPCI-E or PXI-E chassis is implemented with multi-host capability by programming a reconfigurable switch fabric such that one or more of its peripheral slots can receive an upstream host. The upstream host can be used to control a subset of the peripheral modules independent of an upstream host located in a system slot. In this manner, more than one "logical chassis" can be formed within a single physical chassis.

Additionally, in certain embodiments, a cPCI-E or PXI-E chassis is implemented so that multiple links can be connected through a single slot. This can be accomplished by programming the reconfigurable switch fabric to define and/or manage multiple links through a designated slot, and then connecting a multi-link cabled I/O module to that slot. The use of multiple links through a single slot can improve the flexibility of the chassis and allow more economical use of chassis resources. Moreover, the use of multiple links through a single slot can allow a cabled PCI-E module to provide bidirectional connections through a single slot, which can further improve the flexibility and performance of the chassis.

In the description that follows, various embodiments are described with reference to a PXI-E chassis. However, these embodiments could be adapted to another type of PCI-E compatible chassis such as a cPCI-E chassis or PCI-E based expander chassis.

FIG. 1 is a diagram illustrating a PXI-E chassis 100 having a reconfigurable switch fabric in accordance with a representative embodiment. The reconfigurable switch fabric can be programmed or reprogrammed to define multiple upstream hosts each having independent downstream peripheral slots in PXI-E chassis 100. This allows PXI-E chassis 100 to function as multiple logical chassis within a single physical chassis, which can provide increased throughput, control, and compatibility compared with conventional PXI-E chassis.

Referring to FIG. 1, PXI-E chassis 100 comprises a reconfigurable switch fabric 105 and a plurality of module slots 110.

Reconfigurable switch fabric 105 comprises PCI-E switches that can be reconfigured using one or more switch images stored in a non-volatile memory such as an electrically erasable programmable read only memory (EEPROM). One or more of the switch images is loaded into reconfigurable switch fabric 105 upon powering up or resetting PXI-E chassis 100. The switch image(s) can be selected by a user from among multiple stored images. For example, a user requiring only one upstream host in PXI-E chassis 100 may select a switch image that designates a system slot as the primary point of control for the other module slots 110. On the other hand, a user requiring multiple upstream hosts in PXI-E chassis 100 may select a switch image that designates one or more additional module slots 110 to receive an upstream host having corresponding peripheral slots.

Module slots 110 comprise a plurality of slots 1 through 18. These slots include a system slot 1, a timing slot 10, and a plurality of peripheral slots 2 through 9 and 11 through 18. System slot 1 is typically designated to receive a system controller for controlling modules in each of the other slots. The system controller can be, for instance, an embedded blade or PC chipset, or a PCI-E target module controlled by a remote PC. Timing slot 10 is designated to receive a timing module for generating various timing and synchronization signals for the other slots or can be used as a generic PCIe based peripheral slot. The peripheral slots are designated to receive peripheral modules. However, in certain embodiments, reconfigurable switch fabric 105 can be reprogrammed to designate one or more of the peripheral slots to receive an upstream host functioning independent of the system controller in system slot 1.

PXI-E chassis 100 can be implemented in a hosted configuration or a standalone configuration. In the hosted configuration, PXI-E chassis 100 is a logical extension of a host system such as a PC. This can be accomplished, for instance, by connecting the system controller to an upstream switch or the root complex through a cabled PCI-E module. In the standalone configuration, PXI-E chassis 100 typically comprises an embedded controller such as an embedded blade or PC chipset located in system slot 1, or a PCI-E target module controlled by a remote PC located at the other end of a cable. This can provide flexibility, reduce latency in peer-to-peer communications and increase bandwidth available to the processor. In general, a controller of PXI-E chassis 100, such as a single slot control module, can be designed to subsume all functions of a cable card and a remote PC.

Where PXI-E chassis 100 has multiple upstream hosts, each of these hosts can control a different subset of the peripheral slots. For example, a first upstream host in system slot 1 can control peripheral slots 2 through 9, and a second upstream host in peripheral slot 11 can control peripheral slots 12 through 18. In addition, each of the upstream hosts can be defined to control an arbitrary number of the available peripheral slots. For example, PXI-E chassis 100 can be configured to have eight upstream hosts among peripheral slots 2 through 18, where each of the upstream hosts controls one or more of the remaining peripheral slots.

In addition to including multiple hosts, PXI-E chassis 100 can also include multiple processor enabled modules (e.g., measurement blades). For example, any of the peripheral slots of PXI-E chassis 100 can be connected (e.g., through a non-transparent bridge) to a peripheral module controlled by or enhanced by a central processing unit (CPU). Such a CPU can be located in a module within one of the peripheral slots, or it can be connected at the end of an NTB enabled cable card, for example. In an embodiment shown in FIG. 5, for instance, a digitizer 505 and an arbitrary waveform generator 510 can each be implemented by connecting a CPU to PXI-E chassis 100 through a non-transparent bridge.

In some embodiments, a portion of PXI-E chassis 100 controlled through system slot 1 maintains compatibility with the PXI-E specification, while other portions of PXI-E chassis 100 have a separate implementation. These other portions of PXI-E chassis 100 (i.e., additional "logical chassis") can be made to comply with or adapt to the PXI-E specification by duplication of required circuitry for each additional chassis in a backplane descriptor electrical programmable read only memory (EPROM).

One benefit of having multiple upstream hosts in PXI-E chassis 100 is that it allows users to establish multiple independent control and data paths that can operate simultaneously. This can increase the total host bandwidth of PXI-E chassis 100 and reduce the number of slots competing for each available upstream host's resources. In addition, it can allow different groups of users to take advantage of different chassis resources without interfering from each other.

Another benefit of having multiple upstream hosts in PXI-E chassis 100 is that can reduce the system complexity as seen by each of the upstream hosts, which can reduce incompatibilities between PXI-E chassis 100 and certain operating system (OS) or basic input output system (BIOS) requirements. For instance, in some PCs, a BIOS will only enumerate and allocate resources for up to 64 devices in a single system, which is far less than the 256 total devices allowed by PCI based specifications. Where a PXI-E chassis with multiple switches and a high peripheral count is connected to these types of PCs, the entire chassis may become unusable and the PC may be unstable due to the BIOS inability to accommodate such a high number of added devices. By having the option to reduce the number of peripheral modules seen by an upstream host, PXI-E chassis 100 can become usable on a system or multiple systems that would not have been able enumerate a large number of devices.

Figure 2:
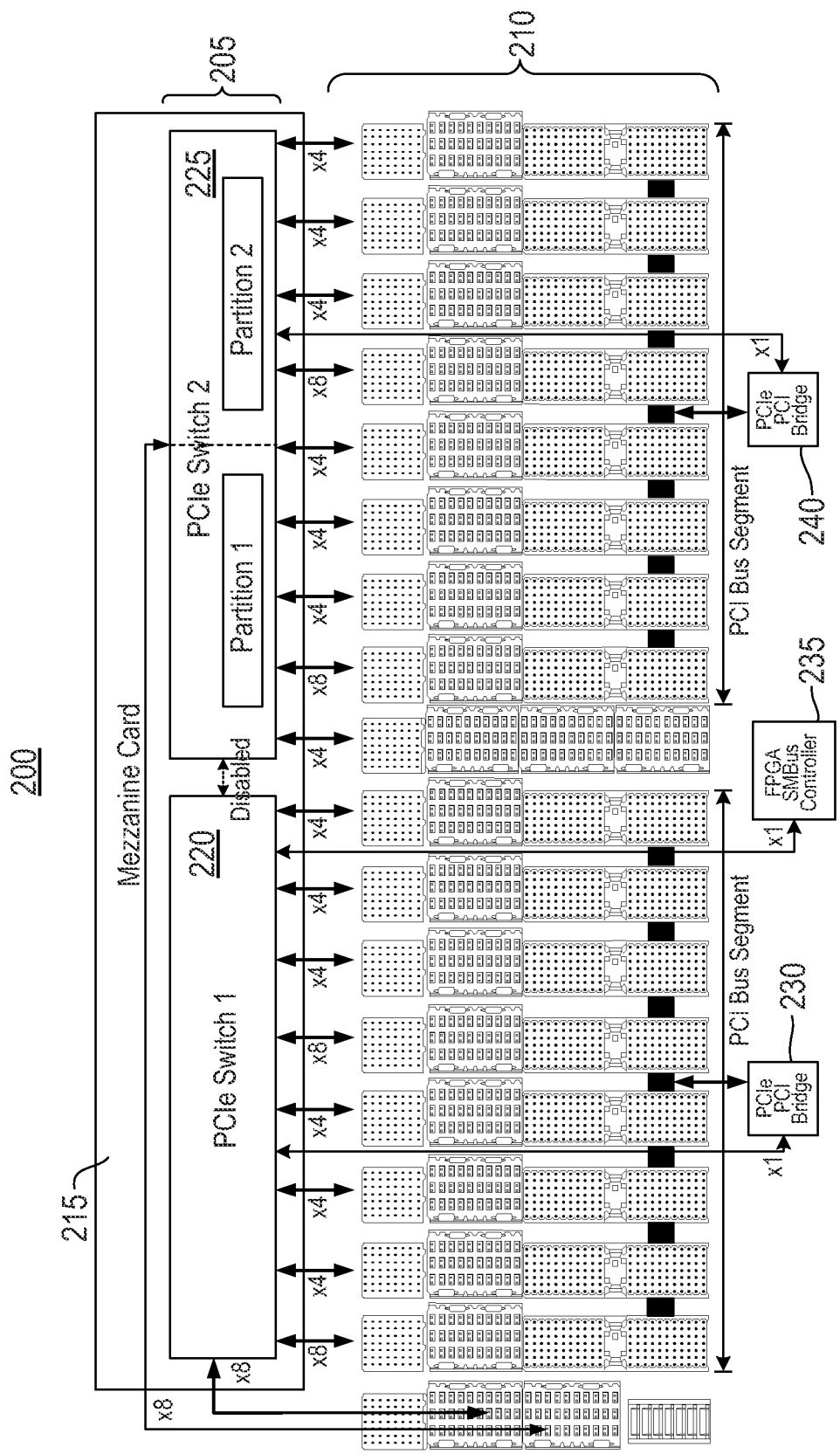
FIG. 2 is a diagram illustrating a multi-host PXI-E chassis in accordance with a representative embodiment.

FIG. 2 is a diagram illustrating a PXI-E chassis 200 in accordance with a representative embodiment. PXI-E chassis 200 is similar to PXI-E chassis 100 of FIG. 1, but it includes additional details for implementing a second logical chassis. Although not specifically labeled in FIG. 2, the slots of PXI-E chassis 200 will be referred to with the same reference numbers 1 through 18 as PXI-E chassis 100.

Referring to FIG. 2, PXI-E chassis 200 comprises a reconfigurable switch fabric 205, a plurality of module slots 210, and controlling logic such as PCI-E to PCI bridges 230 and 240, and an FPGA SMBus controller 235.

Reconfigurable switch fabric 205 comprises two or more PCI-E switches 220 and 225 mounted on a mezzanine card 215. Mezzanine card 215 typically comprises a printed circuit board (PCB) separate from that used to host other components of PXI-E chassis 200. For instance, PXI-E chassis 200 can comprise one PCB for connectors and control logic associated with module slots 210, and another PCB for reconfigurable switch fabric 205. The use of mezzanine card 215 allows a relatively large number of connectors, integrated circuits (ICs), and signal lines to be incorporated in PXI-E chassis 200. This can be useful, for instance, by allowing module slots 210 to be formed of all PXI hybrid slots.

PCI-E switches 220 and 225 are each connected between system slot 1 and eight peripheral slots. More specifically, PCI-E switch 220 is connected between system slot 1 and peripheral slots 2 through 9, and PCI-E switch 225 is connected between system slot 1 and peripheral slots 11 through 18. Each of PCI-E switches 220 and 225 provides up to an 8-lane connection to system slot 1.

PCI-E switches 220 and 225 can be reprogrammed to define multiple partitions corresponding to multiple upstream hosts and corresponding peripheral slots. For instance, PCI-E switch 225 is shown to be divided into two partitions defining two upstream hosts with corresponding peripheral slots. In one of these partitions, peripheral slot 15 is allocated for an upstream host, and peripheral slots 16 through 18 are allocated for downstream endpoints to be controlled through peripheral slot 15. Peripheral slot 15 controls peripheral modules in peripheral slots 16 through 18 through a segment of PCI-E switch 225 defined by the partition. To allow robust communication, peripheral slot 15 can have clock isolation from system slot 1, and it can provide a common clock to peripheral slots 16 through 18.

Because PXI-E chassis 200 has 16 peripheral slots, it can potentially be reprogrammed to define eight logical chassis from a single backplane, where each logical chassis comprises one peripheral slot allocated for an upstream host and another peripheral slot allocated for a corresponding endpoint. It can also be reprogrammed so that any of the peripheral slots can receive a PCI-E cabled card as an upstream host to control one or more downstream endpoints, such as a daisy chained chassis or a peripheral device.

PCI-E switches 220 and 225 can maintain their reprogrammed settings after reset or power cycles of PXI-E chassis 200 by storing corresponding switch images in a nonvolatile memory such as an EEPROM. In addition, to ensure adherence to the PXI-E specification, each additional logical chassis can be accompanied by a backplane descriptor EPROM storing information to implement additional circuitry required by the PXI-E specification. Moreover, for robustness, a mechanism can be included in PXI-E chassis 200 to propagate or disconnect PCI-E resets from each of the logical chassis.

PCI-E switches 220 and 225 can generally be implemented by off the shelf components. For instance, one or more of these switches can take the form of an Integrated Device Technologies (IDT) PES89H64H16AG2 switch, which is a 64-lane IC switch. This switch can be programmed or reprogrammed externally by using software to update its configuration or to modify a corresponding switch image stored in an EEPROM. In addition, more than one EEPROM can be used to store switch images for a single switch. For instance, two EEPROMs can be used to store different switch images for a multi-host configuration or a single-host configuration of PCI-E switch 225.

The design of the connectors in module slots 210 is dictated by the PXI-E specification. However, the overall connector configuration of PXI-E chassis 200 is unique because the peripheral slots have all hybrid connectors. This "all hybrid" configuration adds flexibility to PXI-E chassis 200 by allowing each slot to connect to various PCI and PCI-E modules. In contrast, conventional PXI-E chassis do not include all hybrid slots because of space constraints other factors.

PCI-E to PCI bridges 230 and 240 are used to route signals from PCI based peripheral modules to PCI-E switches 220 and 225. As illustrated in FIG. 2, these bridges are connected between the peripheral slots and PCI-E switches 220 and 225 through a PCI bus.

As described in further detail below, PXI-E chassis 200 can also be configured to allow multiple links through a single slot. For instance, multiple links can be formed through at least one of peripheral slots 2 through 18. In the example of FIG. 2, peripheral slot 2 has eight lanes (i.e., it is a x8 slot) that can be divided into multiple links (e.g., two x4 links or eight x1 links) by programming PCI-E switch 220 to implement these links.

The ability to form multiple links through a single slot can provide better utilization of each slot's bandwidth, and it can provide more flexibility for applications requiring economical use of slots. In addition, it can allow cabled PCI-E modules to form bidirectional links through a single slot, which can be used to connect additional upstream hosts to either a system slot or a peripheral slot.

Figure 3:
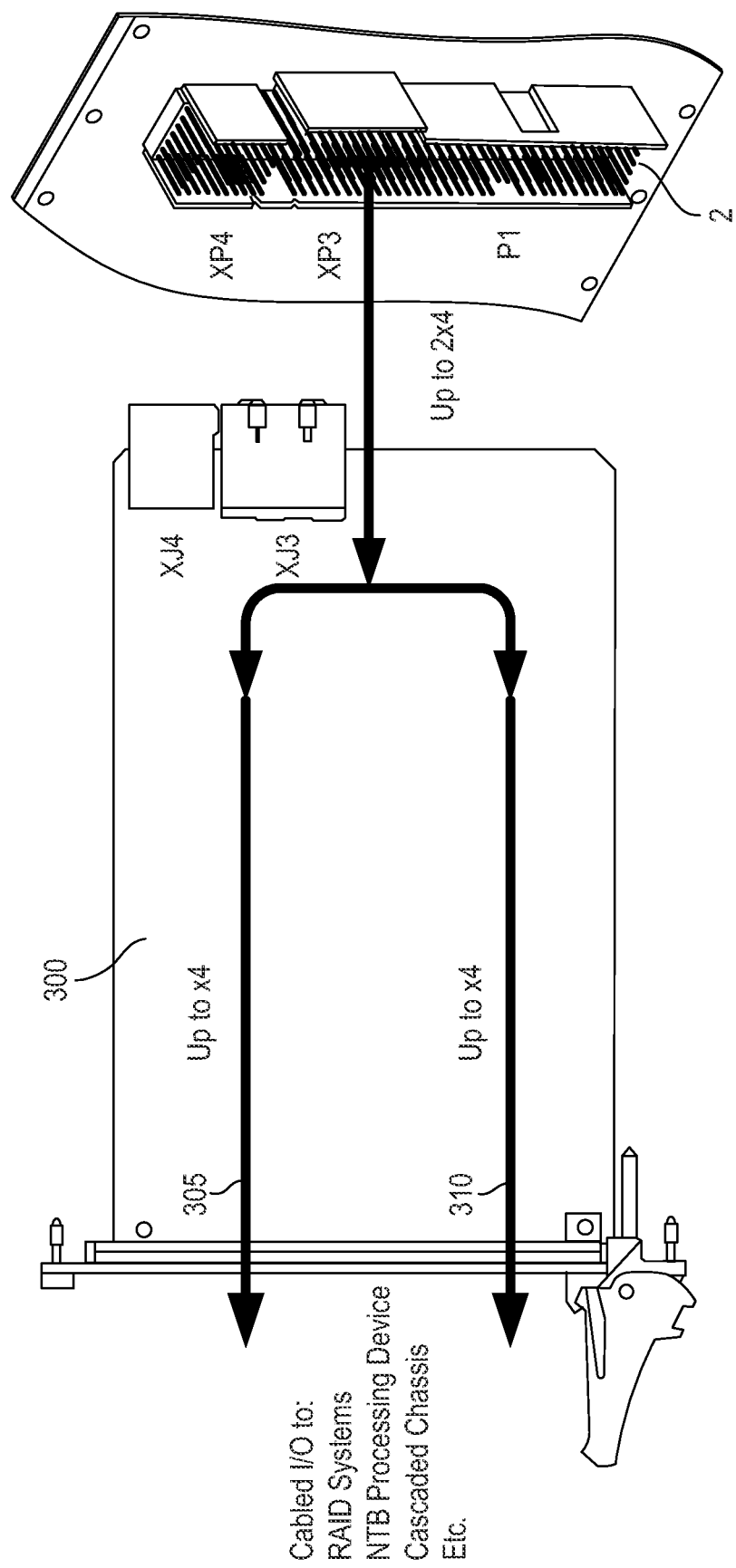
FIG. 3 is a diagram of a PCI-E module configured to connect multiple links into a single peripheral slot of a PXI-E chassis in accordance with a representative embodiment.

FIG. 3 is a diagram of a PCI-E module configured to connect multiple links into a single peripheral slot in accordance with a representative embodiment. More specifically, FIG. 3 is a diagram of a multiple link cabled I/O module 300 that can be connected to multiple PCI-E compatible devices or whatever the PCI-E switch hardware supports.

Referring to FIG. 3, multiple link cabled I/O module 300 is shown connected to peripheral slot 2 of PXI-E chassis 200. Because peripheral slot 2 has eight lanes, it can be divided into two links of four lanes each, four links of two lanes each, or other alternative configurations. The division of peripheral slot 2 is typically accomplished by reconfiguring PCI-E switch 220 to define the link configuration. This reconfiguration can be performed, for instance, by using external software to reprogram a switch image of PCI-E switch 220 in an EEPROM. This could generally be accomplished by placing an additional PCI-E switch onto multiple link cabled I/O module 300 but doing this increases the complexity of the PCI topology and increases latency of the data communication.

In general, the number of links in a slot can be determined by various design considerations such as the characteristics of available peripheral modules. For instance, many existing peripheral modules are configured to use 1, 2, or 4 lane PCI-E links, with most of them using 1 or 4 lane links. One lane links are generally considered to allow the easiest routing to enable PCI-E connectivity, while the four lane links allow for full link width connectivity to an upstream host in a PXI-E chassis having a four-link configuration.

The two links in multiple link cabled I/O module 300 are connected to I/O interfaces 305 and 310 of multiple link cabled I/O module 300, which can be connected to downstream devices. For example, at least one of the links can be connected to a redundant array of independent disks (RAID), a non-transparent bridging (NTB) device, a cascaded PXI-E chassis, or any of various other PCI-E compatible devices. In addition, one or more of these links can be connected to an upstream host as illustrated, for example, in FIGS. 6 through 10.

There are various ways to control multiple links in a single peripheral slot. For example, sideband logic can transmit sideband signals for two links by fanning-out clock and reset lines provided to the peripheral slot to each of the corresponding PCI-E devices. This is possible because the sideband signals are in essence fanned from a single source. Alternatively, the two links can be controlled through hardware lines associated with "merge" operations for each link.

In some embodiments, multiple link cabled I/O module 300 is used in an Agilent M9018A chassis. This chassis has two IDT 64H16AG2 switches, and it comprises 4 slots each having 8 PCI-E lanes. Due to certain characteristics of this chassis and its switches, each of the 8 lane slots can bifurcate its links into two 4-lane links. However, in other embodiments, the slots can be divided in other ways, such as dividing 4 lane slots into four 1-lane links, or dividing 8 lane slots into eight 1-lane links. The Agilent M9018A chassis can be configured to split its links by programming an EEPROM containing a switch's configuration at reset or power up.

Figure 4:
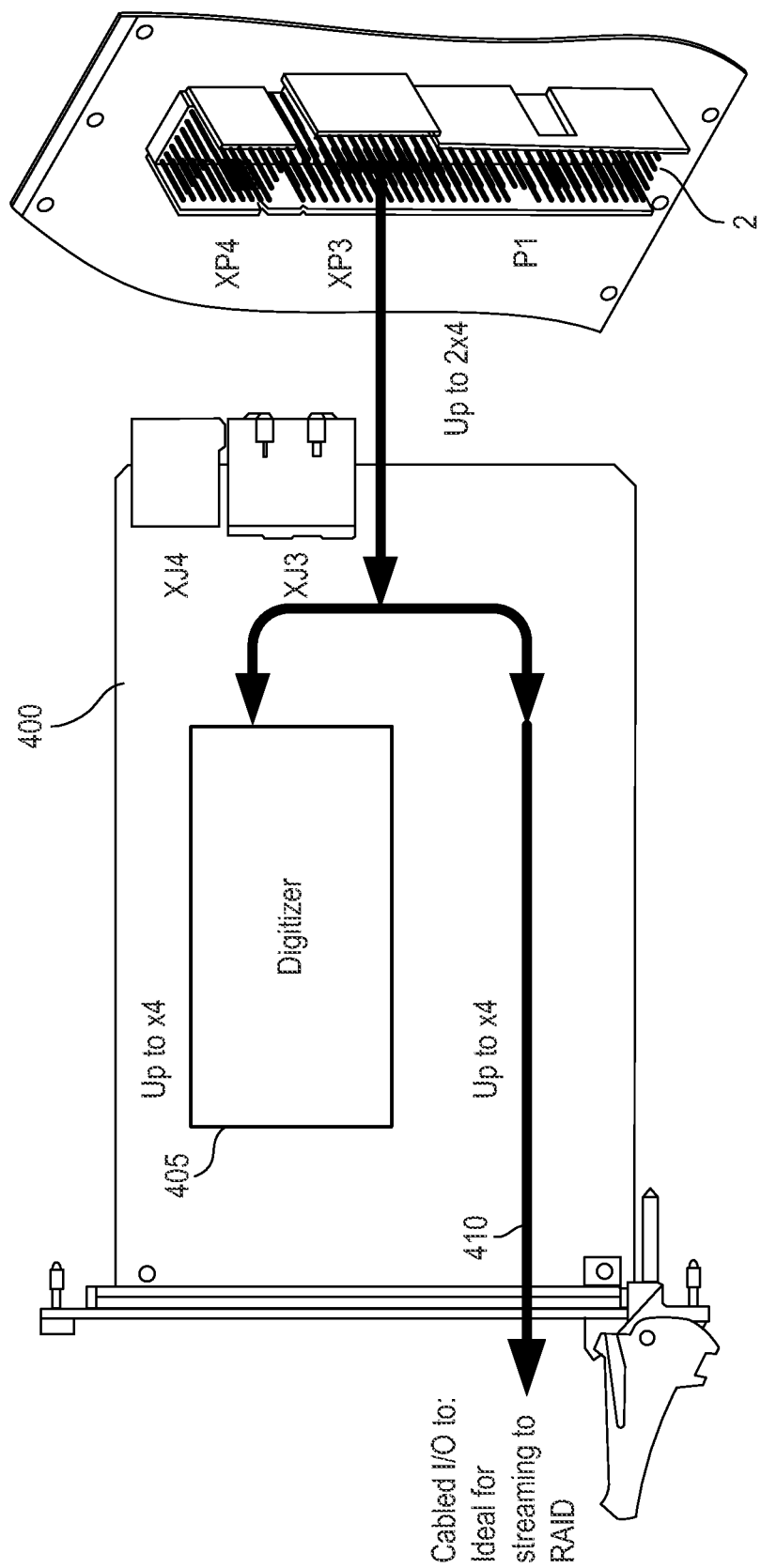
FIG. 4 is a diagram of another PCI-E module configured to connect multiple links into a single peripheral slot of a PXI-E chassis in accordance with a representative embodiment.

FIG. 4 is a diagram of another PCI-E module configured to connect multiple links into a single peripheral slot in accordance with a representative embodiment. More specifically, FIG. 4 is a diagram of a PCI-E module 400 comprising a cabled I/O interface and a digitizer.

Referring to FIG. 4, PCI-E module 400 is connected to peripheral slot 2 of PXI-E chassis 200. Peripheral slot 2 is divided into two x4 links, with one of the links connected to a digitizer 405, and another one of the links connected to a cabled I/O interface 410. Cabled I/O interface 410 can be connected to a downstream peripheral device, such as a RAID. Digitizer 405 and the downstream peripheral device connected to cabled I/O interface 410 are controlled by an upstream host such as the system controller located in slot 1 of PXI-E chassis 200.

Figure 5:
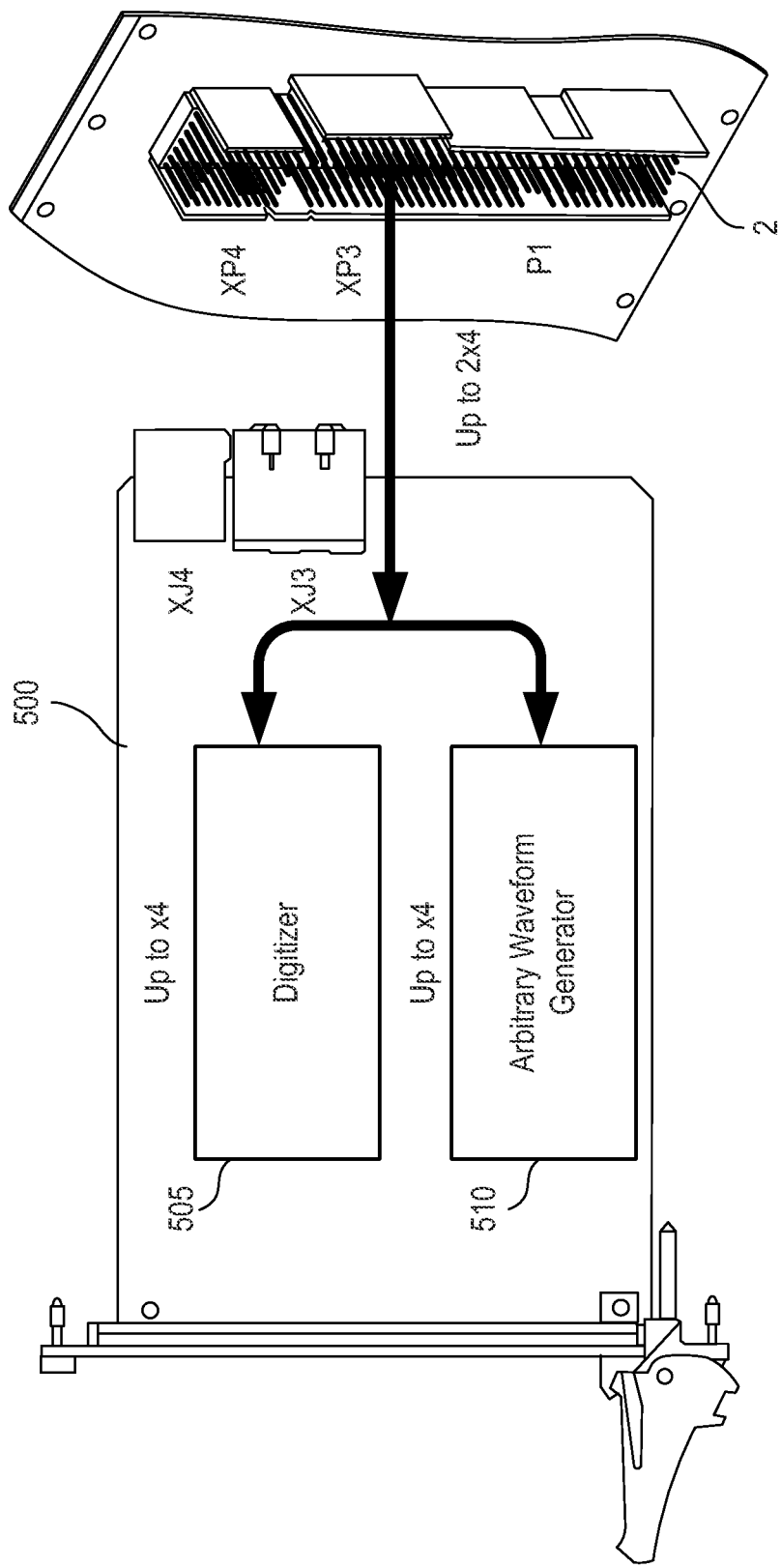
FIG. 5 is a diagram of yet another PCI-E module configured to connect multiple links into a single peripheral slot of a PXI-E chassis in accordance with a representative embodiment.

FIG. 5 is a diagram of yet another PCI-E module configured to connect multiple links into a single peripheral slot in accordance with a representative embodiment. More specifically, FIG. 5 is a diagram of a PCI-E module 500 comprising a digitizer and an arbitrary waveform generator.

Referring to FIG. 5, PCI-E module 500 is connected to peripheral slot 2 of PXI-E chassis 200. Peripheral slot 2 is divided into two x4 links, with one of the links connected to a digitizer 505, and another one of the links connected to an arbitrary waveform generator 510. Digitizer 505 and arbitrary waveform generator 510 are controlled by an upstream host such as the system controller located in slot 1 of PXI-E chassis 200.

Although FIGS. 3 through 5 show specific combinations of cabled I/O interfaces and peripheral devices, as well as specific link configurations, the representative embodiments are not limited to the specific details of these figures. Rather, they merely illustrate that there are various alternative ways of configuring a PCI-E module to use a split peripheral slot. In other embodiments, for instance, a peripheral slot can be split into different numbers of links or links with different numbers of lanes, and the links can be connected to various other types of devices or interfaces.

As indicated by FIGS. 3 through 5, splitting a peripheral slot into multiple links can allow a greater number of peripheral devices to be connected to a chassis. In addition, splitting a slot into multiple links can allow a cabled I/O device to interface with more than one host or target module from a single slot, as described in further detail with reference to FIGS. 6 through 10. Where a single slot is capable of providing an original host connection (required for external PC connected systems) as well as a connection to another device, such as an attached storage system, then one slot is saved, which can be a precious resource in a modular system.

Figure 6:
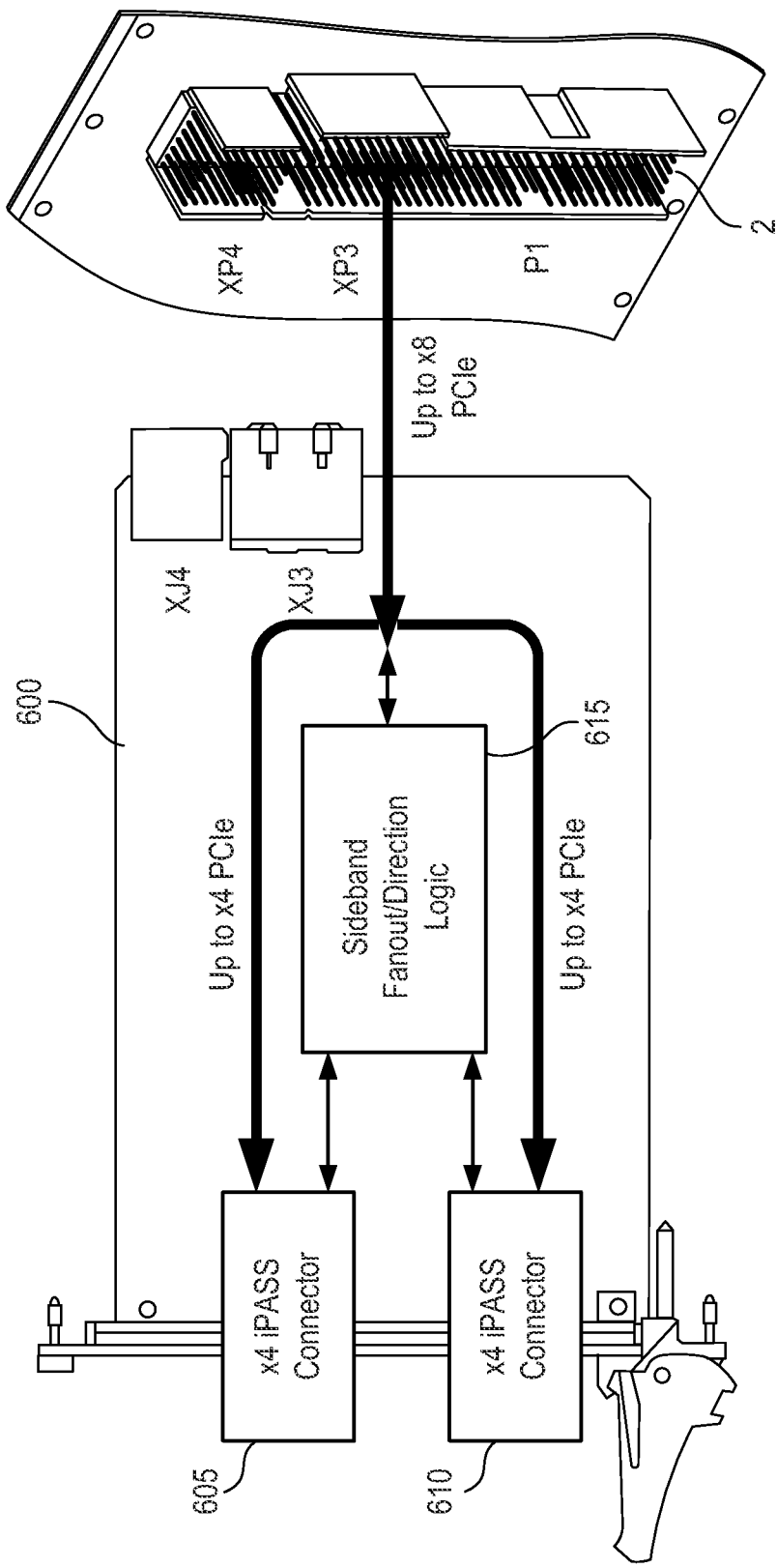
FIG. 6 is a diagram of a cabled PCI-E module configured to create bidirectional connections with a system slot or a peripheral slot in accordance with a representative embodiment.

FIG. 6 is a diagram of a cabled PCI-E module configured to create bidirectional connections with a system slot or a peripheral slot in accordance with a representative embodiment.

Referring to FIG. 6, cabled I/O module 600 comprises two x4 PCI-E links connected to two x4 iPass connectors 605 and 610, and sideband fanout/direction logic 615. The two x4 links are bidirectional, so cabled I/O module 600 can be connected to a PCI-E host device or a PCI-E target device. In addition, lower and upper 4 lanes of the x8 connection from peripheral slot 2 are separated and independently routed to connectors 605 and 610. Although FIG. 6 shows cabled I/O module 600 connected to peripheral slot 2, it could alternatively be connected to other slots, such as system slot 1 or other peripheral slots.

To achieve bidirectional capability in cabled I/O module 600, host and target sideband signaling definitions are implemented in parallel, and their operation is mutually exclusive to prevent contention for resources. This can be accomplished by sideband fanout/direction logic 615, which typically comprises discrete logic components or a programmable logic device. In addition to controlling the direction of the sideband signals, such as the propagation of reset, presence, and other functions, sideband fanout/direction logic 615 can act as a fanout buffer or perform a logical AND/OR function of sideband signals and clocks from a backplane or cabled devices.

Figure 7:
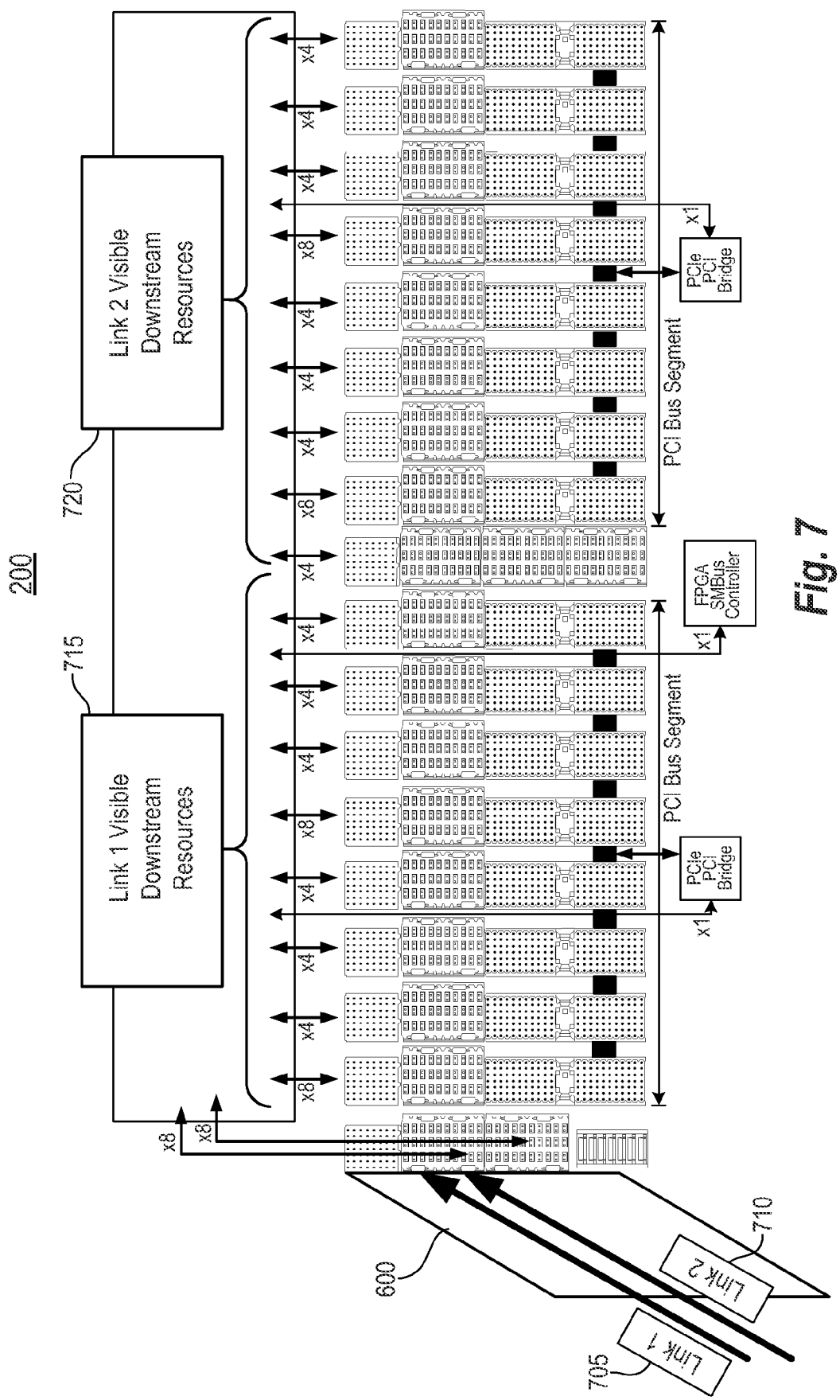
FIG. 7 is a diagram of a PXI-E chassis having a system slot connected to a cabled PCI-E module capable of bidirectional connections in accordance with a representative embodiment.

FIG. 7 is a diagram of a PXI-E chassis having a system slot connected to a cabled PCI-E module capable of bidirectional connections in accordance with a representative embodiment. More specifically, FIG. 7 illustrates PXI-E chassis 200 with cabled I/O module 600 connected to system slot 1 to form two links with upstream devices.

Referring to FIG. 7, cabled I/O module 600 forms two links 705 and 710 into PXI-E chassis 200 through system slot 1. These two target links can be used to connect two independent hosts to different resources in a chassis, or they can be used to allow a single system with two discrete links to control different resources in a single chassis. For example, in FIG. 7, a first upstream host controls downstream resources 715 through link 705, and a second upstream host controls downstream resources 720 through link 710.

This configuration can allow independent use of different slots for different tasks and prevents contention for downstream resources 715 and 720, removing data communication bottlenecks. In an alternative configuration, cabled I/O module 600 is inserted into a peripheral slot having two links to create two upstream hosts connected to a single slot. An example chassis capable of this alternative configuration is Agilent's M9018A PXI-E chassis.

Figure 8:
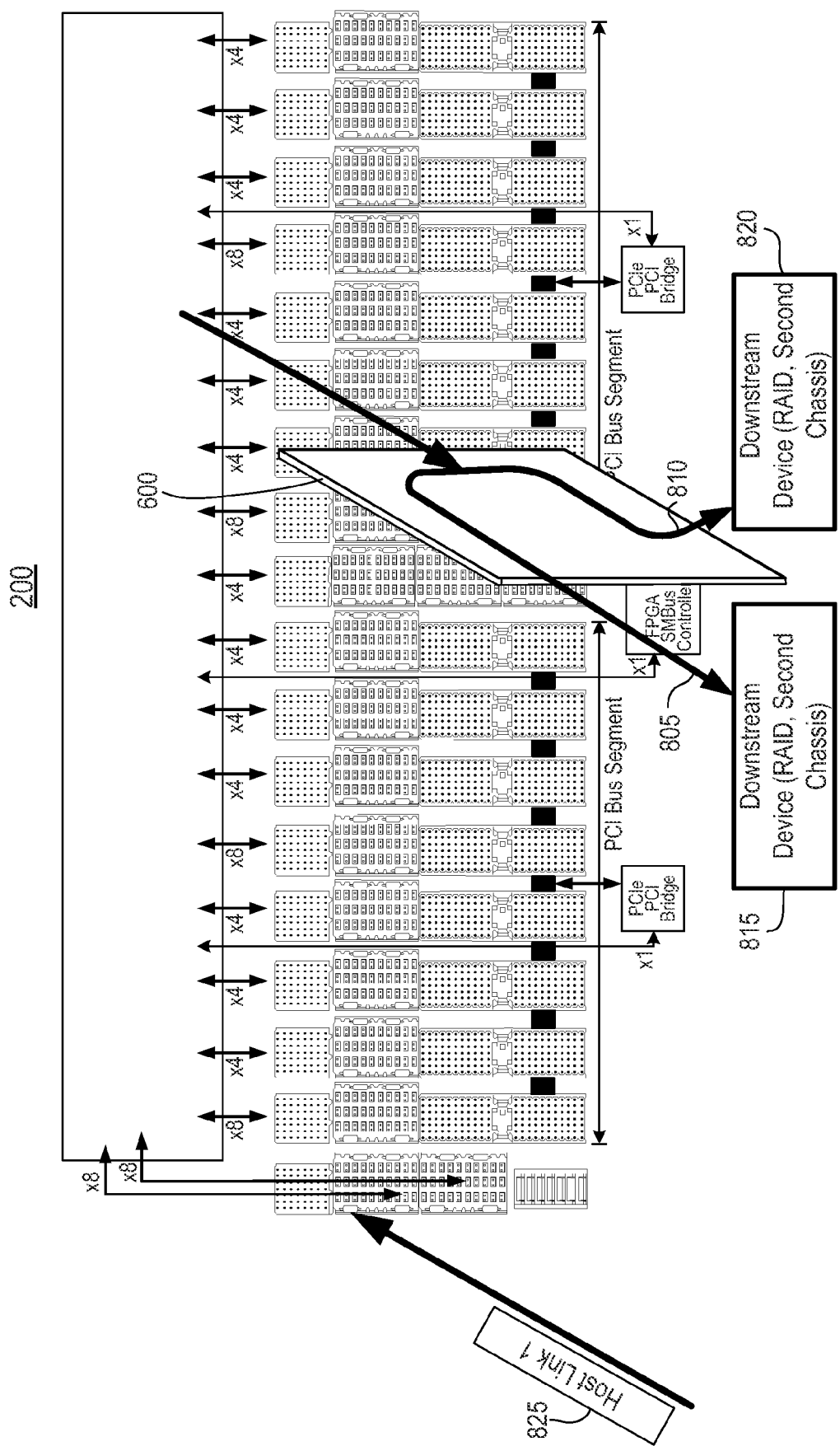
FIG. 8 is a diagram of a PXI-E chassis having a peripheral slot connected to a cabled PCI-E module capable of bidirectional connections in accordance with a representative embodiment.

FIG. 8 is a diagram of a PXI-E chassis having a peripheral slot connected to a cabled PCI-E module capable of bidirectional connections in accordance with a representative embodiment. More specifically, FIG. 8 illustrates PXI-E chassis 200 with multiple link cabled I/O module 300 or cabled I/O module 600 connected to peripheral slot 12 to form two links with downstream devices.

Referring to FIG. 8, cabled I/O module 600 forms two cabled links 805 and 810 through peripheral slot 12. Links 805 and 810 are connected to corresponding downstream devices 815 and 820, which can be RAIDs or additional chassis, for example. A system controller in system slot 1 forms one or more links 825 between an upstream host and downstream devices connected to peripheral slots 2 through 18.

Figure 9:
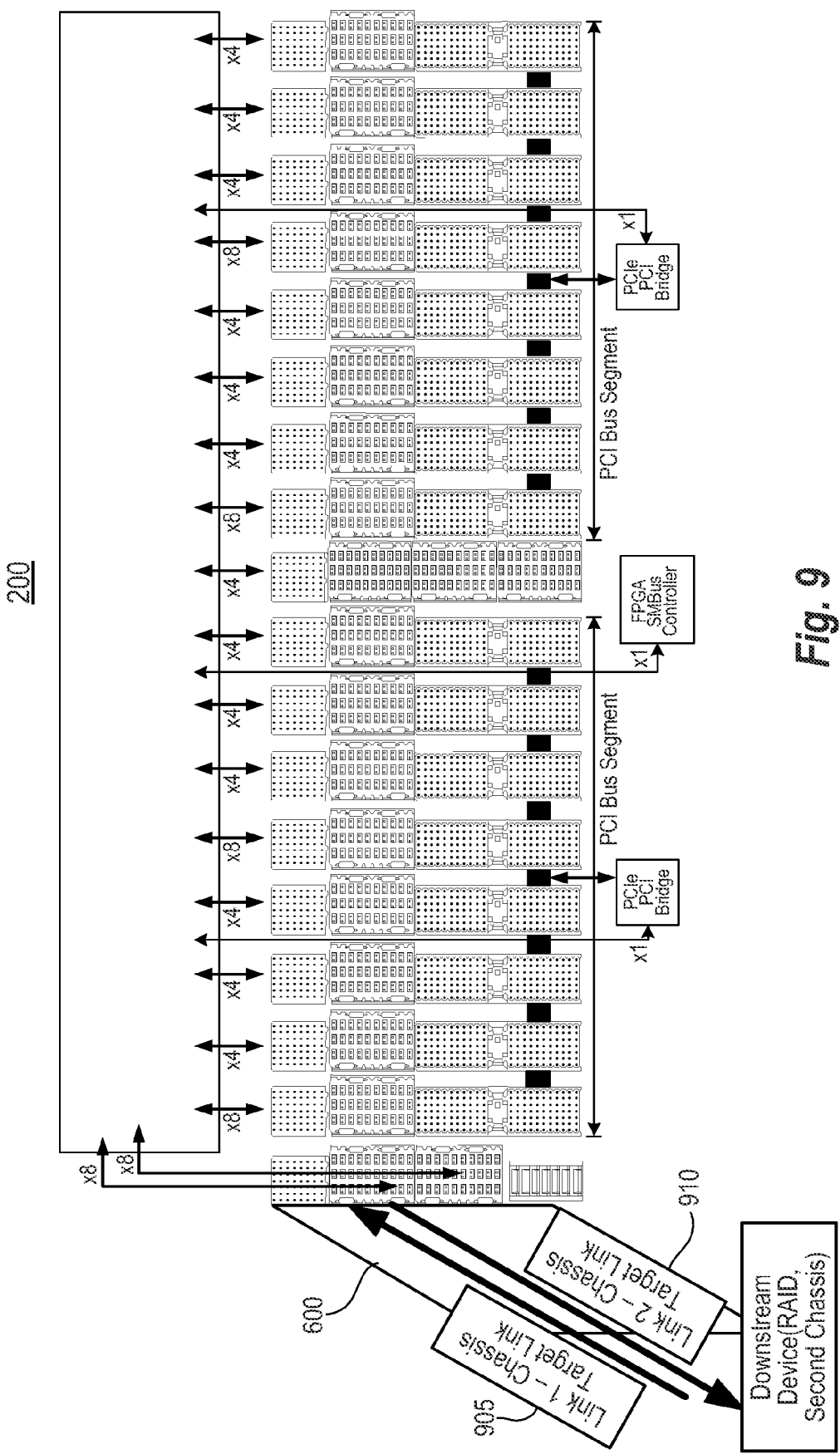
FIG. 9 is a diagram of a PXI-E chassis having a system slot connected to a cabled PCI-E module capable of bidirectional connections in accordance with a representative embodiment.

FIG. 9 is a diagram of a PXI-E chassis having a system slot connected to a cabled PCI-E module capable of bidirectional connections in accordance with a representative embodiment. More specifically, FIG. 9 illustrates PXI-E chassis 200 with cabled I/O module 600 connected to system slot 1 to form one link with an upstream device, and another link with a downstream device.

Referring to FIG. 9, cabled I/O module 600 forms two cabled links 905 and 910 through system slot 1. Link 905 is connected to a remote upstream host, such as a PC. Accordingly, link 905 is a target link of the upstream host. Moreover, link 905 can be used to control the peripheral modules in PXI-E chassis 200, as well as other downstream devices. On the other hand, link 910 is connected to a downstream device such as a RAID or another chassis. Accordingly, link 910 is a host link for the downstream device. This combination of a host link and a target link allows PXI-E chassis 200 to be configured with much greater flexibility compared with conventional PXI-E chassis.

Figure 10:
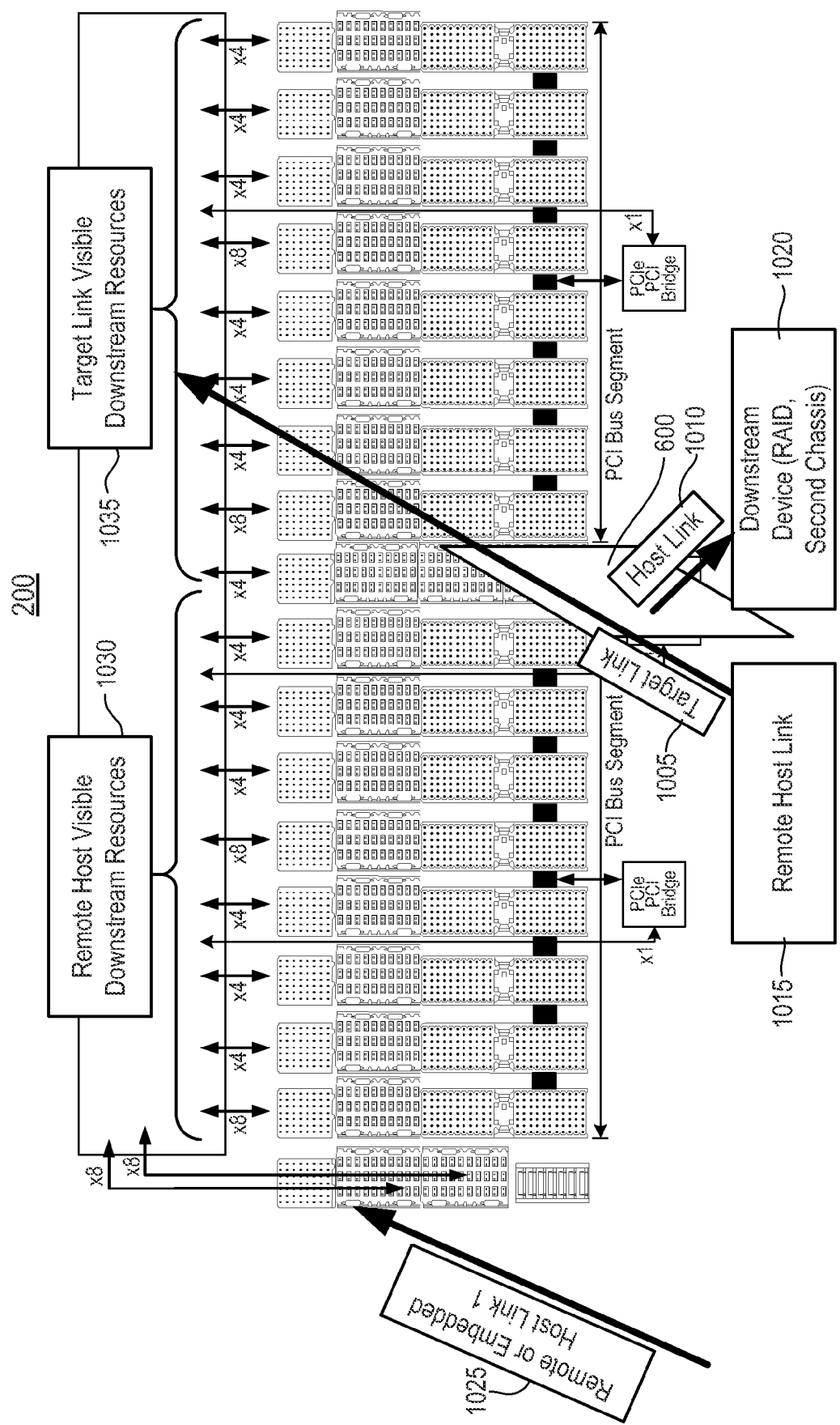
FIG. 10 is a diagram of a PXI-E chassis having a peripheral slot connected to a cabled PCI-E module capable of bidirectional connections in accordance with a representative embodiment.

FIG. 10 is a diagram of a PXI-E chassis having a peripheral slot connected to a cabled PCI-E module capable of bidirectional connections in accordance with a representative embodiment. More specifically, FIG. 10 illustrates PXI-E chassis 200 with cabled I/O module 600 connected to peripheral slot 11 to form one link with an upstream device, and another link with a downstream device.

Referring to FIG. 10, cabled I/O module 600 forms two cabled links 1005 and 1010 through peripheral slot 11. Link 1005 is a target link connected to an upstream host 1015, and link 1010 is a host link connected to a downstream device 1020 such as a RAID or another chassis.

As indicated by FIGS. 7 through 10, cabled I/O module 600 can be configured with four different combinations of target links and host links. In particular, it can have two target links, a target link and a host link, a host link and a target link, or two host links. This allows for multiple host control into a chassis, multiple downstream connections to cabled endpoints, or a combination of the two.

By taking advantage of the possibility of multiple links out of a chassis, bandwidth to a single slot can be configured flexibly to utilize both host and target functions. By connecting multiple links through a single slot, slot resources are saved and bandwidth can be reconfigured from a large x8 link to two x4 links as a system integrator sees fit. The multi-link cabled modules of FIGS. 7 through 10 can also be used in combination with reconfigurable switch fabric 205 (e.g., in an Agilent M9018A chassis), allowing multiple logical chassis to be formed in a single physical chassis.

While example embodiments are disclosed herein, one of ordinary skill in the art appreciates that many variations that are in accordance with the present teachings are possible and remain within the scope of the appended claims. The invention therefore is not to be restricted except within the scope of the appended claims.

The invention claimed is:

1. A peripheral component interconnect express (PCI-E) compatible chassis, comprising:
    a plurality of peripheral slots each configured to receive a peripheral module;
    a system slot configured to receive a first upstream host to control at least one of the peripheral modules; and
    a reconfigurable switch fabric configured to allow at least one of the peripheral slots to receive a second upstream host to control other peripheral modules independent of the first upstream host.

2. The PCI-E compatible chassis of claim 1, wherein the first upstream host comprises an embedded personal computer (PC) chipset or a PCI-E target module in the system slot and controlled by a remote PC.

3. The PCI-E compatible chassis of claim 1, wherein the reconfigurable switch fabric is configured to manage multiple PCI-E links through a single slot.

4. The PCI-E compatible chassis of claim 1, wherein the first upstream host and associated peripheral modules are compatible with the peripheral component interconnect eXtensions for instrumentation express (PXI-E) standard.

5. The PCI-E compatible chassis of claim 1, wherein the reconfigurable switch fabric is configured according to one or more switch images stored in an electrically erasable programmable read only memory (EEPROM).

6. The PCI-E compatible chassis of claim 3, wherein the single peripheral slot is an eight lane peripheral slot and the multiple links comprise two x4 links.

7. The PCI-E compatible chassis of claim 3, wherein the multiple links are connected to a multi-link cabled PCI-E card.

8. The PCI-E compatible chassis of claim 3, wherein the multiple links are connected to multiple devices in a single PCI-E module in the single peripheral slot.

9. The PCI-E compatible chassis of claim 4, further comprising a backplane descriptor circuit storing information used to adapt the second upstream host and associated peripheral modules to the PXI-E standard.

10. The PCI-E compatible chassis of claim 3, wherein the multiple links are connected to a cabled PCI-E interface and an endpoint device formed in a single PCI-E module in the single peripheral slot.

11. The PCI-E compatible chassis of claim 7, wherein the multi-link cabled PCI-E card comprises an interface for an upstream host device and a downstream target device of the PCI-E compatible chassis.

12. The PCI-E compatible chassis of claim 7, wherein the multi-link cabled PCI-E card comprises interfaces for two upstream host devices of the PCI-E compatible chassis.

13. The PCI-E compatible chassis of claim 7, wherein the multi-link cabled PCI-E card comprises interfaces for two downstream target devices of the PCI-E compatible chassis.

14. A peripheral component interconnect express (PCI-E) system, comprising:
 a system slot and a plurality of peripheral slots arranged in a chassis; and
 a multi-link PCI-E module connected to the system slot or one of the peripheral slots and configured to form multiple upstream or downstream links through a single slot of the chassis.

15. The PCI-E system of claim 14, further comprising a reconfigurable switch fabric configured to manage a multi-link configuration of the single slot of the chassis to allow communication between the multi-link PCI-E module and other modules in the chassis.

16. The PCI-E system of claim 14, wherein the multi-link PCI-E module is a cabled PCI-E module connected to a PCI-E host device through a first link of the single slot and connected to a PCI-E target device through a second link of the single slot.

17. The PCI-E system of claim 14, wherein the multi-link PCI-E module is a cabled PCI-E module connected to two PCI-E host devices through separate links of the single slot.

18. The PCI-E system of claim 14, wherein the multi-link PCI-E module is a cabled PCI-E module connected to two PCI-E target devices through separate links of the single slot.

19. The PCI-E system of claim 14, wherein the multi-link PCI-E module is a cabled PCI-E module connected to the system slot and provides at least one upstream link to a PCI-E host device and at least one downstream link to a PCI-E target device.

20. The PCI-E system of claim 14, wherein the multi-link PCI-E module is a cabled PCI-E module and comprises sideband logic configured to transmit sideband signals of the chassis to each of the multiple upstream or downstream links.

* * * * *